United States Patent [19]

Lonzame

[11] Patent Number: 5,349,328
[45] Date of Patent: Sep. 20, 1994

[54] DASHBOARD MOUNTED TIRE PRESSURE INDICATOR

[76] Inventor: Pete S. Lonzame, 4451 W. Rosecrans Ave., Hawthorne, Calif. 90205

[21] Appl. No.: 120,076

[22] Filed: Sep. 13, 1993

[51] Int. Cl.$^5$ .................................. B60C 23/00
[52] U.S. Cl. ........................... 340/442; 340/444; 73/146.5; 116/34 R; 200/61.22; 152/417
[58] Field of Search ............ 340/442, 443, 444; 73/146.4, 146.5; 116/34 R; 200/61.22; 152/417

[56] References Cited

U.S. PATENT DOCUMENTS

| | | | |
|---|---|---|---|
| 2,649,519 | 12/1951 | Brown | 340/442 |
| 3,370,459 | 2/1968 | Cescati | 340/442 |
| 3,646,514 | 2/1972 | Mitchell et al. | 340/442 |
| 3,999,431 | 12/1976 | Makarainen | 340/442 |
| 4,159,465 | 6/1979 | Hatcher | 340/442 |
| 4,814,745 | 3/1989 | Wang | 340/442 |

*Primary Examiner*—John K. Peng
*Assistant Examiner*—Nina Tong
*Attorney, Agent, or Firm*—E. Michael Combs

[57] ABSTRACT

An indicator housing is arranged in operative communication to a plurality of sensor housings, each mounted to a backing plate of an associated vehicle, such that each sensor housing includes a sensor rod reciprocatingly and slidably projecting from the sensor housing, such that upon the respective tire relative to each sensor housing losing air pressure and bulging, deflection of the sensor rod is indicated within the vehicle through the indicator housing.

5 Claims, 4 Drawing Sheets

DASHBOARD MOUNTED TIRE PRESSURE INDICATOR

BACKGROUND OF THE INVENTION

1. Field of the Invention

The field of invention relates to air pressure indicators, and more particularly pertains to a new and improved dashboard mounted tire pressure indicator apparatus wherein the same is in operative communication to sensor housings mounted to backing plates of an associated vehicle, including sensor rods projecting from the sensor housings to indicate loss of air or bulging of tires.

2. Description of the Prior Art

Air pressure sensor structure is available in the prior art indicated and exemplified by the U.S. Pat. Nos. 4,978,941; 4,887,067; 5,109,213; and 5,001,457.

The instant invention attempts to overcome deficiencies of the prior art by providing for a mechanical deflector arranged for operative communication with a respective vehicular tire to sense load deflection of the tire upon loss of air pressure and in this respect, the present invention substantially fulfills this need.

SUMMARY OF THE INVENTION

In view of the foregoing disadvantages inherent in the known types of tire pressure indicator apparatus now present in the prior art, the present invention provides a dashboard mounted tire pressure indicator apparatus wherein the same is arranged to provide for visual indication to an operator of an associated motor vehicle of loss of adequate tire pressure. As such, the general purpose of the present invention, which will be described subsequently in greater detail, is to provide a new and improved dashboard mounted tire pressure indicator apparatus which has all the advantages of the prior art tire pressure indicator apparatus and none of the disadvantages.

To attain this, the present invention provides an indicator housing arranged in operative communication to a plurality of sensor housings, each mounted to a backing plate of an associated vehicle, such that each sensor housing includes a sensor rod reciprocatingly and slidably projecting from the sensor housing, such that upon the respective tire relative to each sensor housing losing air pressure and bulging, deflection of the sensor rod is indicated within the vehicle through the indicator housing.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved dashboard mounted tire pressure indicator apparatus which has all the advantages of the prior art tire pressure indicator apparatus and none of the disadvantages.

It is another object of the present invention to provide a new and improved dashboard mounted tire pressure indicator apparatus which may be easily and efficiently manufactured and marketed.

It is a further object of the present invention to provide a new and improved dashboard mounted tire pressure indicator apparatus which is of a durable and reliable construction.

An even further object of the present invention is to provide a new and improved dashboard mounted tire pressure indicator apparatus which is susceptible of a low cost of manufacture with regard to both materials and labor, and which accordingly is then susceptible of low prices of sale to the consuming public, thereby making such dashboard mounted tire pressure indicator apparatus economically available to the buying public.

Still yet another object of the present invention is to provide a new and improved dashboard mounted tire pressure indicator apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
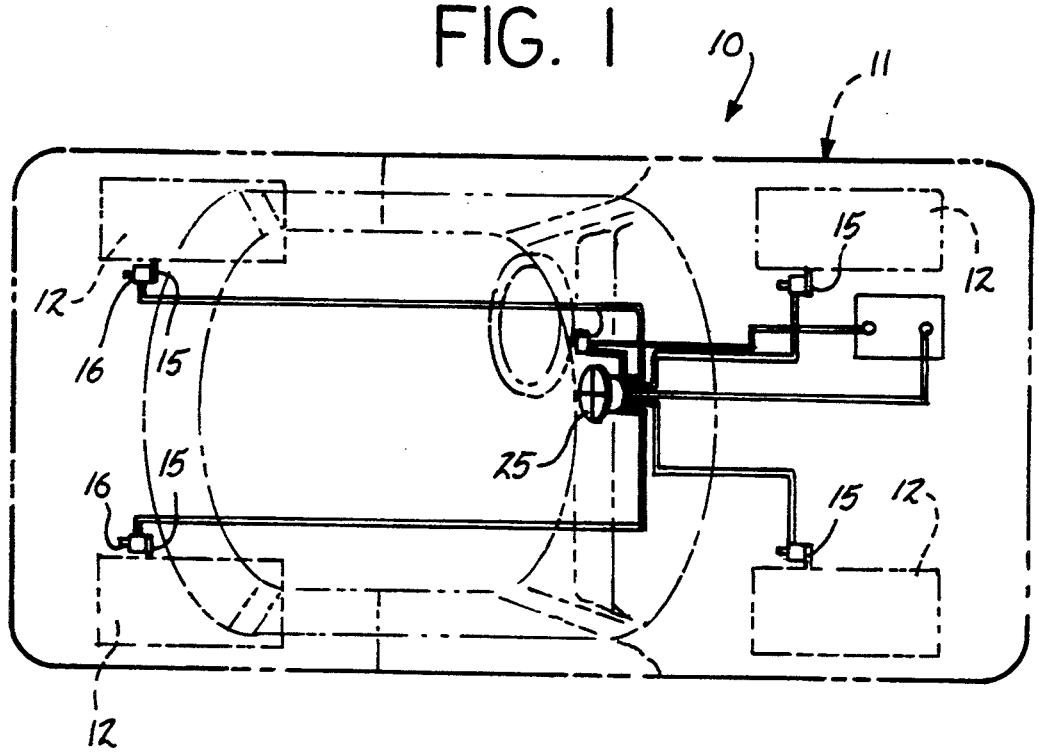
FIG. 1 is an orthographic top view of the invention arranged for positioning within an associated motor vehicle.

With reference now to the drawings, and in particular to FIGS. 1 to 8 thereof, a new and improved dashboard mounted tire pressure indicator apparatus embodying the principles and concepts of the present invention and generally designated by the reference numeral 10 will be described.

Figure 2:
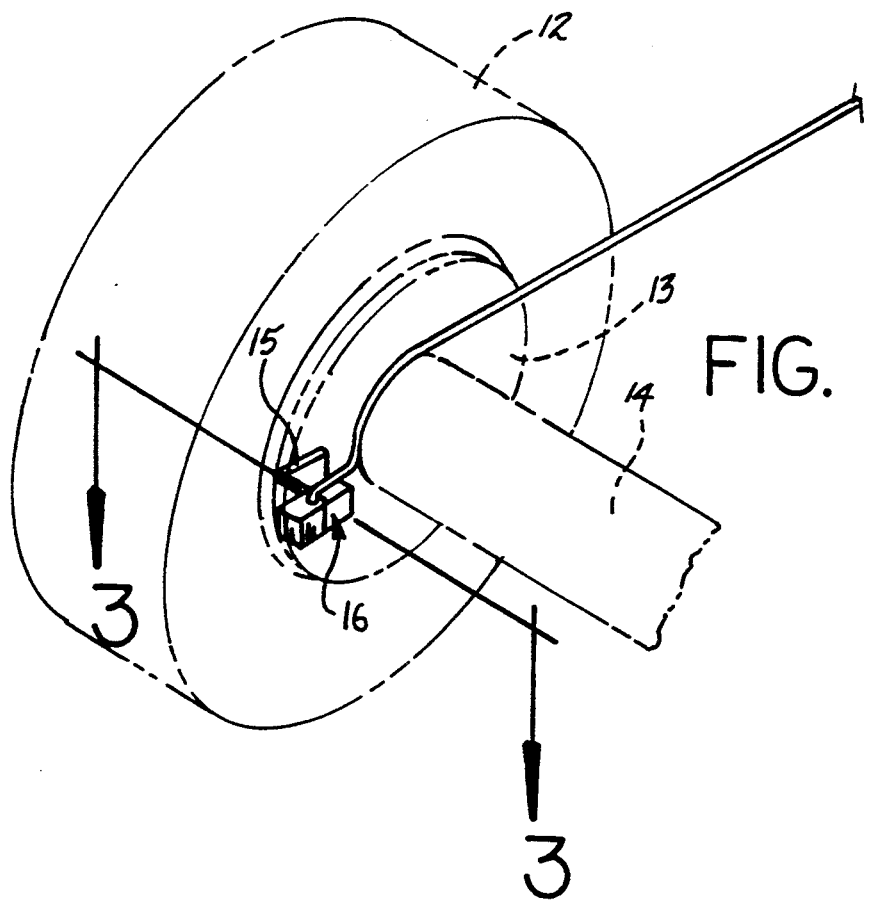
FIG. 2 is an enlarged isometric illustration of an individual sensor housing mounted to a respective vehicular tire.

More specifically, the dashboard mounted tire pressure indicator apparatus 10 of the instant invention essentially comprises cooperation with a vehicle 11, having a plurality of tires 12, such as indicated in FIG. 2, rotatably mounted relative to an axle housing 14, wherein a backing plate 13 is secured to the axle housing, with a mounting bracket 15 secured to the backing plate. Each mounting bracket 15 includes a sensor housing 16 positioned such that the sensor housing front wall 17 is arranged in a facing relationship relative to an associated vehicular tire 12. The sensor housing includes a rear wall secured to the mounting bracket, with a sensor rod 19 reciprocatably and slidably directed through the front wall 17. The sensor rod 19 is fixedly and orthogonally mounted to a mounting plate 20 (see FIG. 3), that in turn is slidably directed within the sensor housing between the front wall and the rear wall. A first spring 21 is captured between the front wall 17 and the mounting plate 20, with a second spring 24 oriented between the mounting plate 20 and the rear wall 18. A first contact 22 is positioned onto the mounting plate 20 in facing relationship relative to a second contact 23 positioned within the housing through the rear wall 18 such that upon compression, deflection of the sensor rod 19 into the housing upon the bulging of a tire, the first contact 22 is effectively directed into communication with the second contact 23 to close the switch structure that the housing 16 functions as and thereby direct illumination onto an individual illumination bulb 26 within a viewing screen 25 mounted to the dashboard portion of the vehicle 11, as indicated in the FIGS. 1 and 4. A typically IX circuit is employed utilizing the vehicular car battery, wherein either a positive or negative connection is completed by the first and second contacts to effect illumination of an individual illumination bulb 26. The illumination bulbs 26 are positioned relative to an orientation within the indicator housing to indicate to an operator of the vehicle which tire is losing pressure.

Figure 5:
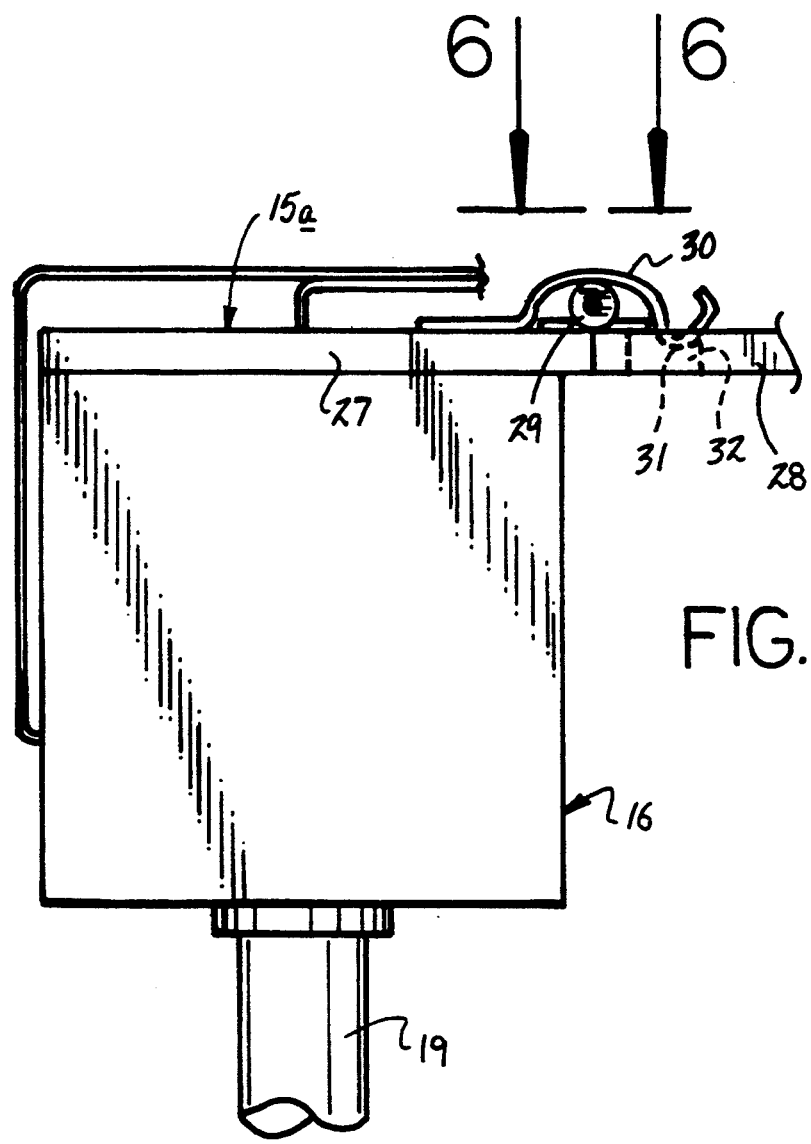
FIG. 5 is an orthographic view of a modified mounting bracket structure employed by the invention.
Figure 6:
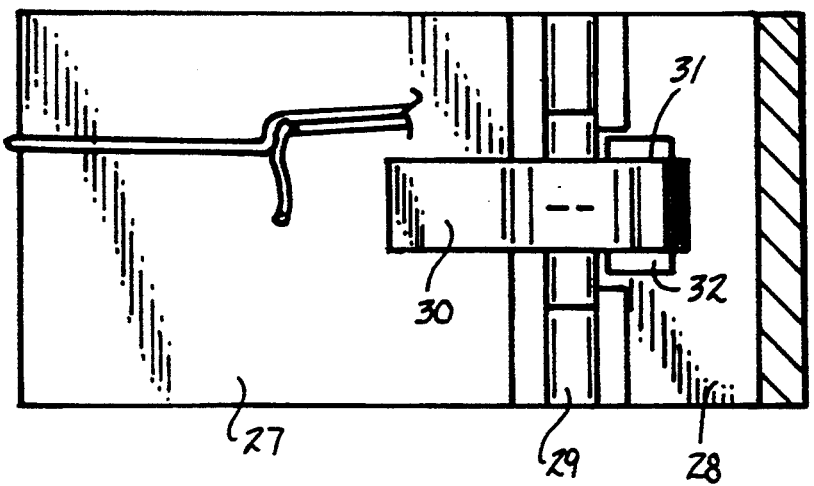
FIG. 6 is an orthographic view, taken along the lines 6—6 of FIG. 5 in the direction indicated by the arrows.

The FIG. 5 indicates the use of a modified mounting bracket 15a, having a first bracket plate 27 mounted to a second bracket plate 28 about a hinge 29, with a spring leg 30 secured to the first bracket plate 27 extending over the hinge 29, such that the spring leg 30 includes a projection 31 received within a second plate recess 32 directed through the second plate. In this manner, removal of the projection 31 from the second plate recess 32 manually permits displacement or pivoting of the first bracket plate 27 relative to the second bracket plate 28 and displacement of the indicator rod 19 relative to the associated tire, such that upon conditions such as increased load effecting deflection of tires and the like, the sensor housing 16 may be displaced and accordingly disactuated.

Figure 3:
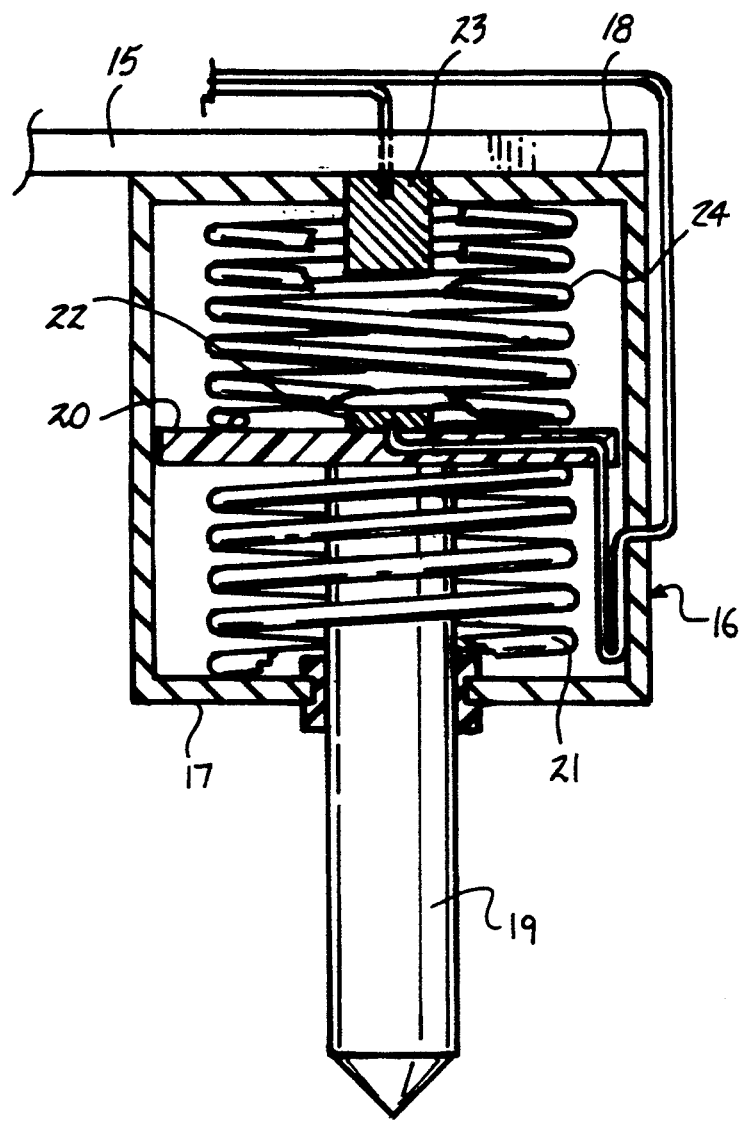
FIG. 3 is an orthographic view, taken along the lines 3—3 of FIG. 2 in the direction indicated by the arrows.
Figure 4:
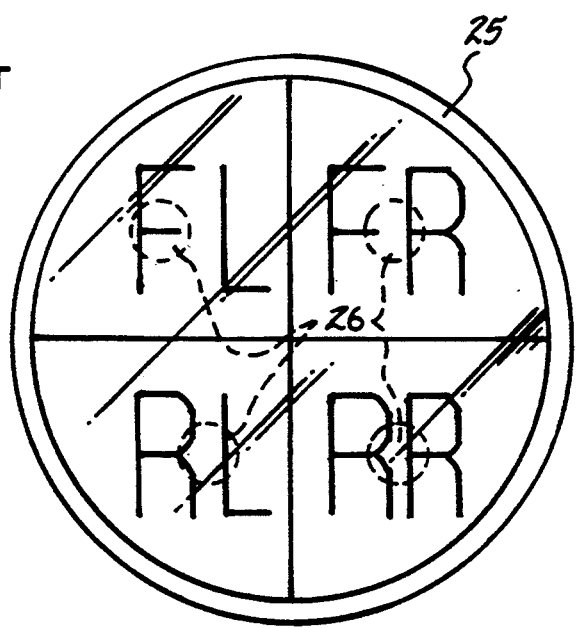
FIG. 4 is an enlarged orthographic view of the viewing screen of the indicator housing structure.
Figure 7:
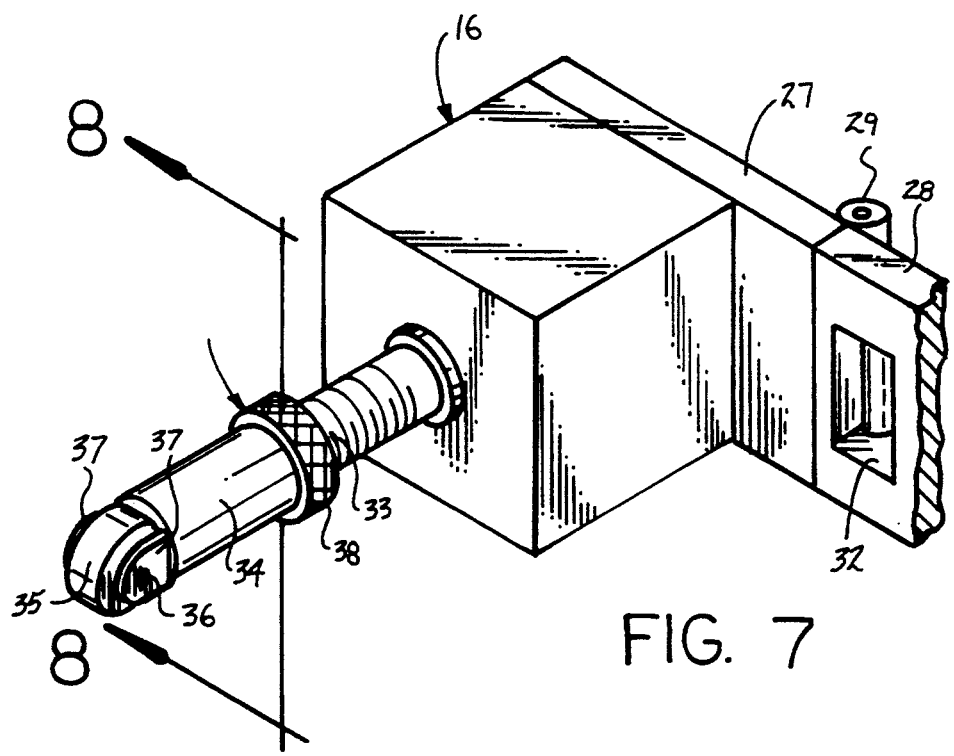
FIG. 7 is an isometric illustration of a modified indicator rod structure.
Figure 8:
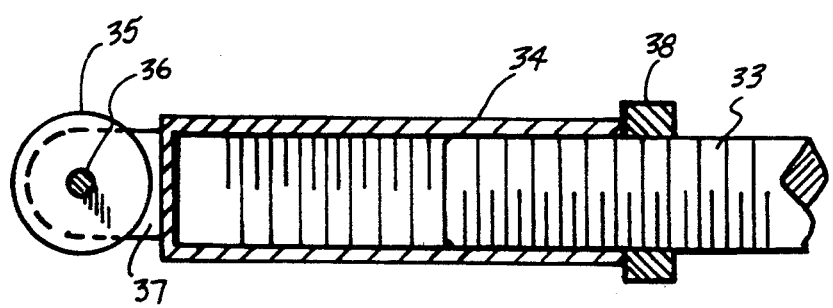
FIG. 8 is an orthographic view, taken along the lines 8—8 of FIG. 7 in the direction indicated by the arrows.

The FIGS. 7 and 8 indicate the use of a modified sensor rod 19a having a sensor rod base leg 33 directed through the front wall 17 and secured to the mounting plate 20, in a manner as indicated in FIG. 3, such that sensor rod sleeve threadedly receives the base leg 33, with the sleeve 34 having roller 35 mounted to the sleeve at an outermost distal end thereof, with the roller 35 rotatably mounted about an axle 36 secured between support plates 37. A lock nut 38 threadedly directed about the base leg 33 is arranged for abutment with the sleeve 34 to provide for securement of the sleeve 34 in a desired longitudinal orientation relative to the base leg 33. The axle 36 is substantially orthogonally oriented relative to an axis of the base leg 33 and the sleeve 34, such that the roller 35 prevents distortion of the modified sensor rod 19 preventing its misalignment relative to the sensor housing 16.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A dashboard mounted tire pressure indicator apparatus arranged for securement and mounting within a vehicle, the vehicle having a plurality of vehicular tires, with each said of vehicular tires rotatively directed about a backing plate, the apparatus comprising, a plurality pressure sensors mounted on respective said vehicular tires wherein each of said sensors comprising, a mounting bracket mounted to a respective said backing plate, wherein said mounting bracket includes a sensor housing, the sensor housing having a front wall spaced from a rear wall, the rear wall mounted to said bracket; and a sensor rod reciprocatably directed through the front wall arranged for adjacency to a respective vehicular tire; and the sensor rod including a mounting plate positioned within the sensor housing between the front wall and the rear wall reciprocatably mounted within the sensor housing, with the sensor rod fixedly mounted to said mounting plate and the mounting plate having a first contact and the rear wall having a second contact, whereupon displacement of the sensor rod within the sensor housing effects engagement of the first contact with the second contact; the apparatus further comprising:

an indicator housing mounted within said vehicle, with the indicator housing including at least one illumination bulb in operative communication with said first contact and said second contact, Whereupon engagement of said first contact with said second contact effects illumination of said illumination bulb.

2. The apparatus as set forth in claim 1 wherein a first spring is captured within said sensor housing between said mounting plate and said front wall, and a second spring captured within said sensor housing between said rear wall and said mounting plate.

3. The apparatus as set forth in claim 2 wherein said mounting bracket includes a first bracket plate and a second bracket plate, and a hinge pivotally mounting said first bracket plate to said second bracket plate, a spring leg fixedly mounted to said first bracket plate extending over said hinge, with said spring leg having a projection, and the second bracket plate having a second plate recess, with said projection arranged for reception within said recess permitting displacement of said projection relative to said recess and pivoting of said first bracket plate to said second bracket plate.

4. The apparatus as set forth in claim 3 wherein said sensor rod includes a sensor rod base leg fixedly secured to said mounting plate, with said sensor rod base leg including a sleeve threadedly receiving said sensor rod base leg, and a roller mounted to said sleeve.

5. The apparatus as set forth in claim 4 wherein said sleeve includes a plurality of spaced support plates, with an axle extending between said support plates and said roller rotatably mounted about said axle., said sensor rod base leg and said sleeve coaxially aligned relative to one another about an axis, with said axle orthogonally oriented relative to said axis.

* * * * *